US012673604B2

(12) United States Patent
Faizan et al.

(10) Patent No.: US 12,673,604 B2
(45) Date of Patent: Jul. 7, 2026

(54) EXTERNAL SHUTTER ASSEMBLY FOR HEADLIGHTS OF VEHICLES TO CONTROL ANGLE OF LIGHT BEAM

(71) Applicant: Mirza Faizan, Irving, TX (US)

(72) Inventors: Mirza Faizan, Irving, TX (US); Rayan Sikkandar, Irving, TX (US); Nitya Sai Kamireddy, Southlake, TX (US); Mustafa Farooqui, Irving, TX (US); Mustafa Anas, Parker, TX (US); Mohammed Kaamil Shadab, Frisco, TX (US); Reva Agrahari, Frisco, TX (US); Jiya Amit Babaria, Frisco, TX (US); Siddharth Rao, Irving, TX (US); Saadia Asaf, Aligarh (IN); Mansoor Hasan Khan, Aligarh (IN); Mirza Rizwan, Patna (IN); Ashaz Haque, Patna (IN); Aarifa Fatima, Patna (IN); Hisham Ahmad, Allen, TX (US)

( * ) Notice: Subject to any disclaimer, the term of this patent is extended or adjusted under 35 U.S.C. 154(b) by 354 days.

(21) Appl. No.: 18/581,019

(22) Filed: Feb. 19, 2024

(65) Prior Publication Data

US 2026/0054636 A1 Feb. 26, 2026

(51) Int. Cl.
| | |
|---|---|
| *B60Q 1/14* | (2006.01) |
| *B60R 16/033* | (2006.01) |
| *F03D 9/25* | (2016.01) |
| *F03D 9/32* | (2016.01) |
| *F21S 41/675* | (2018.01) |

(Continued)

(52) U.S. Cl.
CPC .......... *B60Q 1/1438* (2013.01); *B60R 16/033* (2013.01); *F03D 9/25* (2016.05); *F03D 9/32* (2016.05); *F21S 41/675* (2018.01); *F21S 41/689* (2018.01); *H02J 7/1423* (2013.01); *H02J 7/143* (2020.01); *B60Q 2300/42* (2013.01); *F05B 2220/706* (2013.01)

(58) Field of Classification Search
CPC ..... B60Q 1/1438; B60R 16/033; F21V 11/04; F21S 41/675; F21S 41/689
See application file for complete search history.

(56) References Cited

U.S. PATENT DOCUMENTS

| | | | | |
|---|---|---|---|---|
| 1,421,838 A | * | 7/1922 | Schaeffer | ............. B60Q 1/1438 362/279 |
| 1,725,117 A | * | 8/1929 | Walthers | ............... F21S 41/683 362/325 |

(Continued)

*Primary Examiner* — Tracie Y Green
*Assistant Examiner* — Michael Chiang

(57) ABSTRACT

An external shutter assembly to control a light beam emitted by a headlight of a vehicle includes a pair of transparent structures arranged facing the headlight and a blind assembly arranged between the transparent structures. The blind assembly includes a support rod extending movably coupled to a first transparent structure and a base rod fixedly coupled to a second transparent structure. The support rod is arranged to be displaced in the vertical direction. The blind assembly further includes a plurality of blinds arrayed in a vertical direction and arranged spaced apart from each other with first ends the blinds being pivotally coupled to the base rod and second end of the blinds attached to the support rod. The blinds pivot between a horizontal position and a slanted position in response to the vertical displacement of the support rod to control an angle of the light beam.

20 Claims, 3 Drawing Sheets

(51) Int. Cl.
  *F21S 41/689*     (2018.01)
  *H02J 7/14*      (2006.01)

(56)         References Cited

U.S. PATENT DOCUMENTS

| | | | | | |
|---|---|---|---|---|---|
| 1,797,881 | A | * | 3/1931 | Schoen | F21S 41/683 |
| | | | | | 362/325 |
| 2,119,370 | A | * | 5/1938 | Van Leunen | F21S 41/43 |
| | | | | | 362/300 |
| 3,079,529 | A | * | 2/1963 | Novinger | B60Q 1/0023 |
| | | | | | 250/214 D |
| 4,794,494 | A | * | 12/1988 | Reeder | F21S 41/43 |
| | | | | | 362/325 |
| 5,077,649 | A | * | 12/1991 | Jackel | F21V 13/10 |
| | | | | | 362/279 |
| 2006/0256571 | A1 | * | 11/2006 | Davidson | F21S 41/675 |
| | | | | | 362/507 |
| 2011/0264333 | A1 | * | 10/2011 | Yuter | B60J 3/02 |
| | | | | | 296/97.4 |
| 2022/0396198 | A1 | * | 12/2022 | Kim | F21S 41/689 |

* cited by examiner

EXTERNAL SHUTTER ASSEMBLY FOR HEADLIGHTS OF VEHICLES TO CONTROL ANGLE OF LIGHT BEAM

TECHNICAL FIELD

The present disclosure relates, generally, to a vehicle, and more particularly relates to an external shutter assembly suitably retrofitted to a vehicle to control an angle of a light beam emitted by a headlight of the vehicle.

BACKGROUND

Traditionally, vehicle headlights are designed to operate in both low and high beam settings, offering drivers flexibility for varying driving conditions. The high beam settings of the headlight play a crucial role in enhancing driver's visibility, particularly in dark and low-visibility conditions, due to their intense brightness and extended range. However, the intense brightness of the high beam may cause a blinding effect on drivers of the vehicles coming from the opposite direction, which is undesirable.

SUMMARY

One aspect of the disclosure relates to an external shutter assembly to control a light beam emitted by a headlight of a vehicle. The external shutter assembly includes a pair of transparent structures arranged spaced apart and substantially parallel to each other defining a gap therebetween and adapted to be arranged facing the headlight to enable a passage of the light beam and a blind assembly arranged inside gap. The blind assembly includes at least one support rod extending in a vertical direction and movably coupled to a first transparent structure of the pair of transparent structures and at least one base rod fixedly coupled to a second transparent structure of the pair of transparent structures. The at least one support rod is arranged to be displaced in the vertical direction. The blind assembly further includes a plurality of blinds arrayed in a vertical direction and arranged spaced apart from each other with a first end of each of the plurality of blinds being pivotally coupled to the at least one base rod and a second end of each of the plurality of blinds being attached to the at least one support rod. The plurality of blinds is adapted to pivot between a horizontal position and a slanted position in response to the vertical displacement of the at least one support rod to control an angle of the light beam exiting the external shutter assembly.

In some additional, alternative, or selectively cumulative embodiment, the external shutter assembly includes an actuator operatively coupled to the at least one support rod and configured to displace the at least one support rod in the vertical direction.

In some additional, alternative, or selectively cumulative embodiment, the actuator includes a rack and pinion assembly coupled to the at least one support rod to enable the displacement of the at least support rod in the vertical direction.

In some additional, alternative, or selectively cumulative embodiment, the actuator includes an electric motor configured to drive the rack and pinion assembly to enable the vertical displacement of the at least one support rod.

In some additional, alternative, or selectively cumulative embodiment, the external shutter assembly further includes at least one first sensor to determine a distance of an approaching vehicle from the vehicle and a controller configured to control the actuator to pivot the plurality of blinds based on the input received from the at least one first sensor.

In some additional, alternative, or selectively cumulative embodiment, the external shutter assembly further includes at least one second sensor to determine an intensity of light coming from an approaching vehicle and a controller configured to control the actuator to pivot the plurality of blinds based on the input received from the at least one second sensor.

In some additional, alternative, or selectively cumulative embodiment, the external shutter assembly includes at least one battery to provide electrical power to the actuator.

In some additional, alternative, or selectively cumulative embodiment, the external shutter assembly includes at least one fan configured to rotate in response to a flow of air generated during a movement of the vehicle and at least one generator operatively coupled to the at least one fan to generate electric power to recharge the at least one battery.

In some additional, alternative, or selectively cumulative embodiment, each of the blinds includes a reflective surface to reflect the light beam received from the headlight at a desired angle.

In accordance with another embodiment of the disclosure, a vehicle is disclosed. The vehicle includes a headlight configured to emit a light beam and an external shutter assembly mounted to the vehicle to control an angle of the light beam. The external shutter assembly includes a pair of transparent structures arranged facing the headlight to enable a passage of the light beam and disposed spaced apart and substantially parallel to each other defining a gap therebetween. The external shutter assembly further includes at least one support rod arranged inside the gap and extending in a vertical direction, the at least one support rod is movably coupled to a first transparent structure of the pair of transparent structures and is arranged to be displaced in the vertical direction and at least one base rod fixedly coupled to a second transparent structure of the pair of transparent structures and arranged inside the gap. The external shutter assembly includes a plurality of blinds arrayed in a vertical direction inside the gap and arranged spaced apart from each other with a first end of each of the plurality of blinds being pivotally coupled to the at least one base rod and a second end of each of the plurality of blinds being attached to the at least one support rod and the plurality of blinds is adapted to pivot between a horizontal position and a slanted position in response to the vertical displacement of the at least one support rod to control an angle of the light beam exiting the external shutter assembly.

In some additional, alternative, or selectively cumulative embodiments, the vehicle further includes an actuator operatively coupled to the at least one support rod and configured to displace the at least one support rod in the vertical direction.

In some additional, alternative, or selectively cumulative embodiments, the vehicle further includes at least one first sensor to determine a distance of an approaching vehicle from the vehicle, and a controller configured to control the actuator to pivot the plurality of blinds based on the input received from the at least one first sensor.

In some additional, alternative, or selectively cumulative embodiments, the vehicle further includes at least one second sensor to determine an intensity of light coming from an approaching vehicle, and a controller configured to control the actuator to pivot the plurality of blinds based on the input received from the at least one second sensor.

In some additional, alternative, or selectively cumulative embodiments, the vehicle further includes a rack and pinion assembly coupled to the at least one support rod, and an electric motor to operate the rack and pinion assembly to displace the at least one support in the vertical direction.

In some additional, alternative, or selectively cumulative embodiment, the vehicle further includes at least one battery to provide electrical power to the electric motor.

In some additional, alternative, or selectively cumulative embodiments, the vehicle further includes a reflective surface to reflect the light beam received from the headlight at a desired angle.

In accordance with an embodiment of the disclosure, an external shutter assembly to control a light beam emitted by a headlight of a vehicle is disclosed. The external shutter assembly includes a pair of transparent structures arranged spaced apart and substantially parallel to each other defining a gap therebetween and adapted to be arranged facing the headlight to enable a passage of the light beam and a blind assembly arranged inside gap and at least one support rod extending in a vertical direction and movably coupled to a first transparent structure of the pair of transparent structures, and the at least one support rod is arranged to be displaced in the vertical direction and the external shutter assembly further includes at least one base rod fixedly coupled to a second transparent structure of the pair of transparent structures. The external shutter assembly further includes a plurality of blinds arrayed in a vertical direction and arranged spaced apart from each other with a first end of each of the plurality of blinds being pivotally coupled to the at least one base rod and a second end of each of the plurality of blinds being attached to the at least one support rod to enable the pivoting of the plurality of blinds between a horizontal position and a slanted position. The external shutter assembly further includes an actuator operatively coupled to the at least one support rod and configured to displace the at least one support rod in the vertical direction to pivot the plurality of blinds to control an angle of the light beam exiting the external shutter assembly.

In some additional, alternative, or selectively cumulative embodiments, the external shutter assembly further includes at least one first sensor to determine a distance of an approaching vehicle from the vehicle, and a controller configured to control the actuator to pivot the plurality of blinds based on the input received from the at least one first sensor.

In some additional, alternative, or selectively cumulative embodiments, the external shutter assembly further includes at least one second sensor to determine an intensity of light coming from an approaching vehicle, and a controller configured to control the actuator to pivot the plurality of blinds based on the input received from the at least one second sensor.

In some additional, alternative, or selectively cumulative embodiments, each of the blinds includes a reflective surface to reflect the light beam received from the headlight at a desired angle.

BRIEF DESCRIPTION OF THE ACCOMPANYING DRAWINGS

Having thus described example embodiments of the present disclosure in general terms, reference will now be made to the accompanying drawings, which are not necessarily drawn to scale, and wherein:

DETAILED DESCRIPTION

Figure 1:
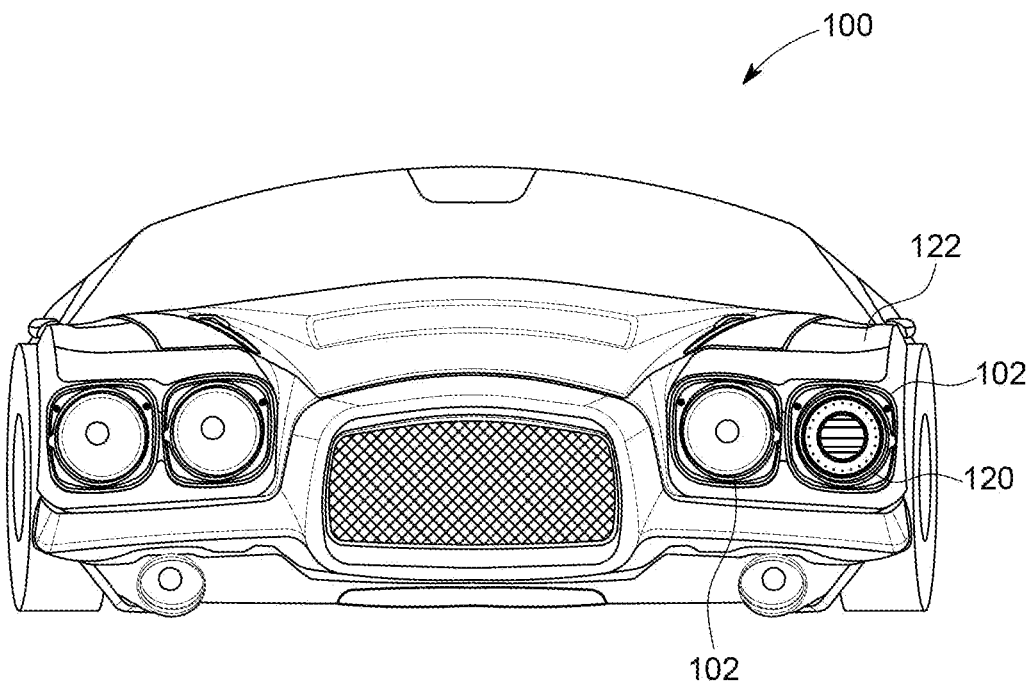
FIG. 1 illustrates a front view of a vehicle depicting a headlight of the vehicle having an external shutter assembly arranged in front of and facing the headlight, in accordance with an embodiment of the disclosure.

In the following description, for purposes of explanation, numerous specific details are set forth in order to provide a thorough understanding of the present disclosure. It will be apparent, however, to one skilled in the art that the present disclosure can be practiced without these specific details. In other instances, apparatus and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. The use of any term should not be taken to limit the spirit and scope of embodiments of the present disclosure.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Referring to FIG. 1, a vehicle 100 having a headlight 102 arranged at a front end of the vehicle 100 is shown. The headlight 102 emits a light beam to illuminate a road ahead of the vehicle 100. As shown, the headlight 102 includes one or more light bulbs, a reflector, and a cover lens 104. The light bulb is adapted to be used as a light source and the reflector is arranged surrounding the light bulb and configured to reflect the light produced by the bulb onto the road. The cover lens 104 is arranged facing the light bulb and the reflector and is configured to facilitate distribution and dispersion of the light from the bulb.

Figure 2:
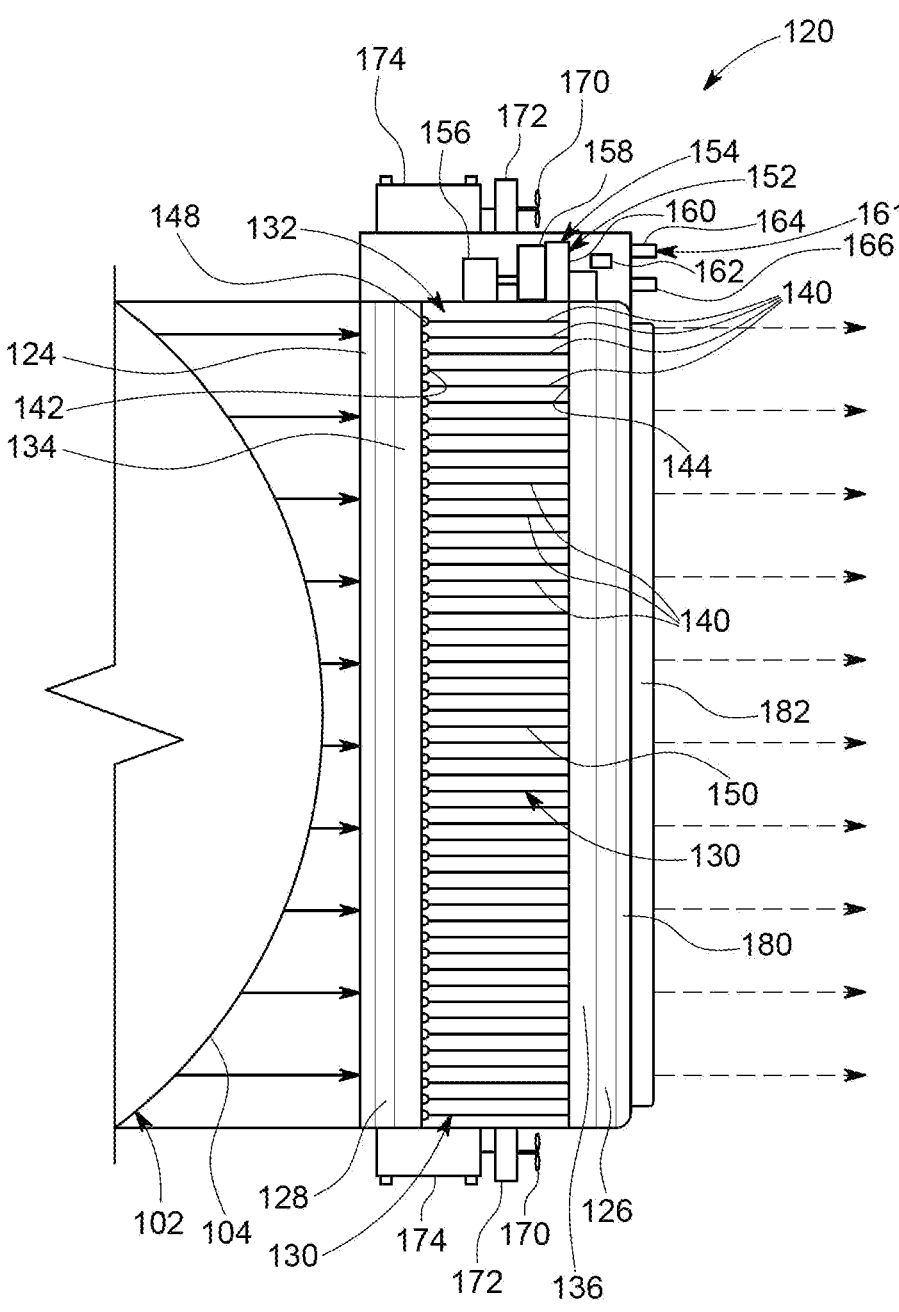
FIG. 2 illustrates a schematic view of the external shutter assembly of FIG. 1 having a plurality of blinds arranged in a horizontal position, in accordance with an embodiment of the disclosure.
Figure 3:
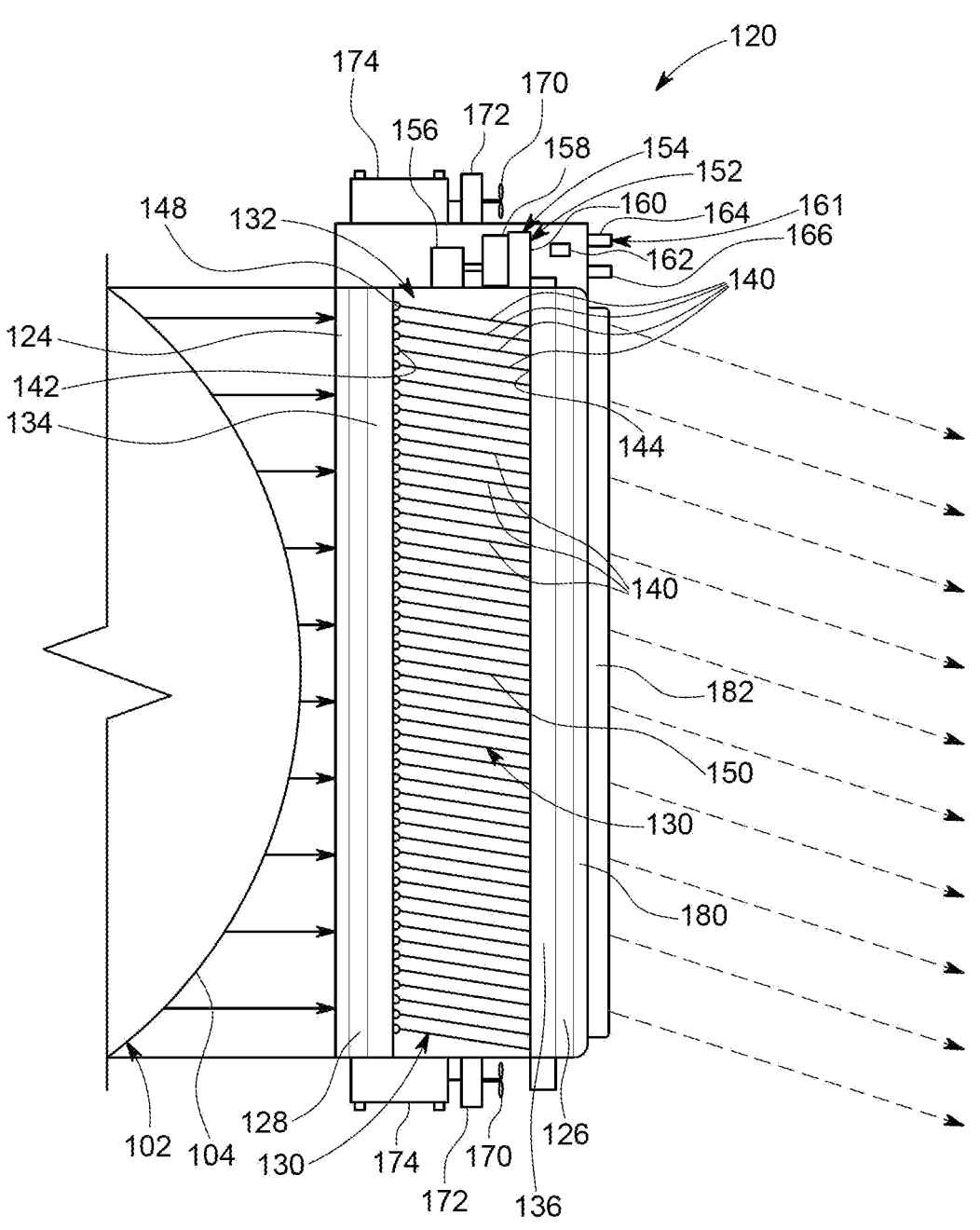
FIG. 3 illustrates a schematic view of the external shutter assembly of FIG. 1 having the plurality of blinds arranged in a slanted position, in accordance with an embodiment of the disclosure.

Further, to control the light beam (i.e., an angle of the light beam) projected towards the road, the vehicle 100 includes an external shutter assembly 120 mounted to the vehicle 100, for example, a vehicle body 122, and arranged in front of the headlight 102, facing the headlight 102. The external shutter assembly 120 includes a frame 124 mounting the external shutter assembly 120 to the vehicle body 122 and supporting various components of the external shutter assembly 120. In an embodiment, the frame 124 is removably mounted to the vehicle body 122 by using a plurality of fasteners. As shown in FIGS. 2 and 3, the external shutter assembly 120 includes a pair of transparent structures, for example, a first transparent structure 126 and a second transparent structure 128, arranged spaced apart from each other and substantially parallel to each other, and a blind assembly 130 arranged in a gap 132 defined between the transparent structures 126, 128.

As shown in FIGS. 2 and 3, the first transparent structure 126 is arranged distally to the cover lens 104, while the second transparent structure 128 is disposed proximate to the cover lens 104. It may be appreciated that edges of the transparent structures 126, 128 are connected to the frame 124, thereby the transparent structures 126, 128 are supported on the frame 124. In an embodiment, the transparent structures 126, 128 are made of glass. However, the transparent structures 126, 128 may be made of any other material, such as, but not limited to, transparent plastic, fiber, or any suitable material that enables transmission of light with minimum reflection.

To control the angle of the light beam exiting the external shutter assembly 120 i.e., the first transparent structure 126, the blind assembly 130 includes at least one base rod 134 attached to the second transparent structure 128, at least one support rod 136 attached to the first transparent structure 126, and a plurality of blinds 140 arrayed in a vertical direction and extending between the at least one support rod 136 and the at least one base rod 134. In an embodiment, the least one base rod 134 includes two base rods extending along vertical edges of the second transparent structure 128 and fixedly attached to the second transparent structure 128. Accordingly, the base rod 134 extends in the vertical direction and remains stationary while operating the plurality of blinds 140. Similar to the at least one base rod 134, in an embodiment, the at least one support rod 136 includes two support rods extending in the vertical direction, along the vertical edges of the first transparent structure 126. It may be appreciated that the support rod 136 is arranged such that the support rod 136 may be moved/displaced in the vertical direction relative to the first transparent structure 126, hence movably coupled to the first transparent structure 126.

Further, the plurality of blinds 140 is supported on the base rod 134 and the support rod 136 and extends between the gap 132. As shown, each of the blinds 140 includes a first end 142 pivotally attached to the base rod 134, and a second end 144 attached to the support rod 136. Accordingly, the blinds 140 pivot between a first position (i.e., horizontal position), shown in FIG. 2, and a second position (i.e., slanted position), shown in FIG. 3, relative to the base rod 134 about a respective pivot axis as the support rod 136 is moved vertically between an up position (i.e., first position, shown in FIG. 2) and a down position (i.e., second position, shown in FIG. 3), respectively. In an embodiment, the pivot axis is a substantially horizontal axis. To enable the pivotal engagement of the blinds 140 with the at least one base rod 134, the blind assembly 130 may include a plurality of hinges 148, with one hinge 148 connecting one blind 140 to a single base rod 134. Although the blinds 140 are contemplated to be pivotally coupled to the at least one base rod 134, it may be envisioned that, in some embodiments, the at least one base rod 134 may be omitted, and in such a case, the blinds 140 are pivotally attached to the second transparent structure 128.

In the first position, first surfaces 150 of the blinds 140 are arranged substantially horizontally, as shown in FIG. 2, to allow the passage of the light beam received from the headlight 102 without changing the angle of the light beam. In the second position, the first surfaces 150 of the blinds 140 are arranged at an inclination/angle relative to the horizontal axis, as shown in FIG. 3, to change the angle of the light beam received from the headlight 102. In the illustrated embodiment, the first surfaces 150 are reflecting surfaces to reflect the light beam at a desired angle to change the angle of the light beam received from the headlight 102. In some embodiments, suitable reflectors may be attached to the first surfaces 150 of the blinds 140 to suitably reflect the incident light beam.

To vertically displace/move the at least one support rod 136 between the first position and the second position and hence move the blinds 140 between the horizontal position and the slanted position, the external shutter assembly 120 further includes an actuator 152 operatively coupled to the at least one support rod 136. In the illustrated embodiment, the actuator 152 includes a rack and pinion assembly 154, and an electric motor 156 operatively coupled to the rack and pinion assembly 154 to operate the rack and pinion assembly 154. As shown, the rack and pinion assembly 154 includes a pinion 158, i.e., a gear 158, mounted on a motor shaft and arranged to rotate in response to an operation/actuation of the electric motor 156. Further, a rack 160 of the rack and pinion assembly 154 is engaged with the at least one support rod 136 and extends in the vertical direction and is operatively engaged with the pinion 158. The rack 160 is arranged to move up and down in the vertical direction in response to the rotation of the pinion 158. Accordingly, the at least one support rod 136 moves in the vertical direction as the rack 160 is displaced in the vertical direction by operating the electric motor 156. Although the rack 160 is contemplated to be separate from the at least one support rod 136, it may be appreciated that the rack 160 may be defined by a portion of the support rod 136 and in such case, teeth of the rack 160 is formed on the support rod 136. Also, the electric motor 156 is a bi-directional motor and is rotated in a first direction to displace the support rod 136 vertically downwardly and is rotated in a second direction to displace the support rod 136 vertically upwardly.

In an embodiment, to operate/actuate the electric motor 156 and hence to position the blinds 140 at a desired position to control the angle of the light beam exiting the external shutter assembly 120, the external shutter assembly 120 includes a controller 162. In some embodiments, the external shutter assembly 120 includes a switch adapted to be operated by a driver of the vehicle 100 and is arranged in communication with the controller 162. The controller 162 is configured to operate the electric motor 156 according to the position/operation of the switch to arrange the blinds 140 at the horizontal position or the slanted position.

In some embodiments, the external shutter assembly 120 includes a sensing system 161 to sense/detect one or more parameters associated with an approaching vehicle. In an embodiment, the approaching vehicle is a vehicle which is moving towards the vehicle 100 from a location forward of the vehicle 100. In an embodiment, the sensing system 161 includes at least one first sensor 164 to determine a distance of the approaching vehicle from the vehicle 100. In some embodiments, the at least one first sensor 164 is also configured to detect a direction of movement i.e., heading of the approaching vehicle. In some embodiments, the least one first sensor 164 is a camera. In some embodiments, the sensing system 161 may include a separate sensor to determine a heading i.e., direction of the approaching vehicle relative to vehicle 100. The sensing system 161 is arranged in communication with the controller 162 and provides input to the controller 162. Based on the data input from the sensing system 161, the controller 162 is configured to determine the heading and the distance of the approaching vehicle, and control the plurality of blinds 140 to control the angle of the first surface 150 of the blinds 140 relative to the horizontal axis and therefore controls the angle of light beam exiting the first transparent structure 126 i.e., the external shutter assembly 120.

In some embodiments, the sensing system 161 may include at least one second sensor 166 to determine/measure an intensity of light received from the headlight of the approaching vehicle. In some embodiment, the controller 162 is configured to measure the light intensity received from the approaching vehicle continuously and determines the heading i.e., whether the approaching vehicle is moving toward the vehicle 100 if the intensity increases as the time elapses. Further, the controller 162 is configured to control the blinds 140 and move the blinds 140 to the slanted position when the light intensity detected by the at least one second sensor 166 is above a predetermined value. In may be appreciated that the controller 162 may control the electric motor 156 and hence positioning of the blinds 140 based on the input received from the at least one first sensor 164 and/or the at least one second sensor 166. In this manner, the external shutter assembly 120 facilitates automatic or manual control of the angle of light beam emanating from the vehicle 100. The switching of the light beam from the high beam to the low beam, while a vehicle is coming from the opposite direction prevents a glare in eyes of a driver of the approaching vehicle.

Additionally, or optionally, the external shutter assembly 120 may include at least one fan 170 arranged supported on the frame 124 that acts as a wind turbine and is rotated due to air blowing over the vehicle 100 as the vehicle 100 moves on the surface. Further, the external shutter assembly 120 may include at least one generator 172 operatively coupled to the at least one fan 170 to generate electricity in response to the rotation of the at least one fan 170. To store the electric power generated by the at least one generator 172, the external shutter assembly 120 may include at least one battery 174 which is used to provide electrical power to various electrical and electronic components of the external shutter assembly 120.

Moreover, the external shutter assembly 120 may include a yellow curtain 180 adapted to be deployed to cover the first transparent structure 126 to provide improved visibility during foggy conditions. Moreover, the external shutter assembly 120 includes a protective glass 182 arranged forward of the first transparent structure 126 such that the yellow curtain 180 is arranged between the first transparent structure 126 and the protective glass 182. It may be appreciated that all the components of the external shutter assembly 120 except the switch is arranged/mounted/assembly/supported on the frame 124 and accordingly, the external shutter assembly 120 is suitable as retrofit external shutter assembly that is retrofitted to existing vehicles to enable control of the angle of the light beam and control the lighting as the high beam or the low beam.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An external shutter assembly to control a light beam emitted by a headlight of a vehicle, the external shutter assembly comprising:
   a pair of transparent structures arranged spaced apart and substantially parallel to each other defining a gap therebetween and adapted to be arranged facing the headlight to enable a passage of the light beam; and
   a blind assembly arranged inside the gap and including
   at least one support rod extending in a vertical direction and movably coupled to a first transparent structure of the pair of transparent structures, wherein the at least one support rod is arranged to be displaced in the vertical direction,
   at least one base rod fixedly coupled to a second transparent structure of the pair of transparent structures, and
   a plurality of blinds arrayed in the vertical direction and arranged spaced apart from each other with a first end of each of the plurality of blinds being pivotally coupled to the at least one base rod and a second end of each of the plurality of blinds being attached to the at least one support rod,
   wherein the plurality of blinds is adapted to pivot between a horizontal position and a slanted position in response to the vertical displacement of the at least one support rod to control an angle of the light beam exiting the external shutter assembly.

2. The external shutter assembly of claim 1 further including an actuator operatively coupled to the at least one support rod and configured to displace the at least one support rod in the vertical direction.

3. The external shutter assembly of claim 2, wherein the actuator includes a rack and pinion assembly coupled to the at least one support rod to enable the displacement of the at least support rod in the vertical direction.

4. The external shutter assembly of claim 3, wherein the actuator includes an electric motor configured to drive the rack and pinion assembly to enable the vertical displacement of the at least one support rod.

5. The external shutter assembly of claim 2 further including
   at least one first sensor to determine a distance of an approaching vehicle from the vehicle, and a controller configured to control the actuator to pivot the plurality of blinds based on the input received from the at least one first sensor.

6. The external shutter assembly of claim 2 further including at least one second sensor to determine an intensity of light coming from an approaching vehicle, and a controller configured to control the actuator to pivot the plurality of blinds based on the input received from the at least one second sensor.

7. The external shutter assembly of claim 2 further including at least one battery to provide electrical power to the actuator.

8. The external shutter assembly of claim 7 further including at least one fan configured to rotate in response to a flow of air generated during a movement of the vehicle, and at least one generator operatively coupled to the at least one fan to generate electric power to recharge the at least one battery.

9. The external shutter assembly of claim 1, wherein each of the blinds includes a reflective surface to reflect the light beam received from the headlight at a desired angle.

10. A vehicle, comprising:

a headlight configured to emit a light beam; and an external shutter assembly mounted to the vehicle to control an angle of the light beam, the external shutter assembly includes a pair of transparent structures arranged facing the headlight to enable a passage of the light beam and disposed spaced apart and substantially parallel to each other defining a gap therebetween, at least one support rod arranged inside the gap and extending in a vertical direction, the at least one support rod is movably coupled to a first transparent structure of the pair of transparent structures and is arranged to be displaced in the vertical direction, at least one base rod fixedly coupled to a second transparent structure of the pair of transparent structures and arranged inside the gap, and a plurality of blinds arrayed in the vertical direction inside the gap and arranged spaced apart from each other with a first end of each of the plurality of blinds being pivotally coupled to the at least one base rod and a second end of each of the plurality of blinds being attached to the at least one support rod, wherein the plurality of blinds is adapted to pivot between a horizontal position and a slanted position in response to the vertical displacement of the at least one support rod to control an angle of the light beam exiting the external shutter assembly.

11. The vehicle of claim 10 further including an actuator operatively coupled to the at least one support rod and configured to displace the at least one support rod in the vertical direction.

12. The vehicle of claim 11 further including at least one first sensor to determine a distance of an approaching vehicle from the vehicle, and a controller configured to control the actuator to pivot the plurality of blinds based on the input received from the at least one first sensor.

13. The vehicle of claim 11 further including at least one second sensor to determine an intensity of light coming from an approaching vehicle, and a controller configured to control the actuator to pivot the plurality of blinds based on the input received from the at least one second sensor.

14. The vehicle of claim 11, wherein the actuator includes a rack and pinion assembly coupled to the at least one support rod, and an electric motor to operate the rack and pinion assembly to displace the at least one support in the vertical direction.

15. The vehicle of claim 14 further including at least one battery to provide electrical power to the electric motor.

16. The vehicle of claim 10, wherein each of the blinds includes a reflective surface to reflect the light beam received from the headlight at a desired angle.

17. An external shutter assembly to control a light beam emitted by a headlight of a vehicle, the external shutter assembly comprising:

a pair of transparent structures arranged spaced apart and substantially parallel to each other defining a gap therebetween and adapted to be arranged facing the headlight to enable a passage of the light beam; and a blind assembly arranged inside the gap and including at least one support rod extending in a vertical direction and movably coupled to a first transparent structure of the pair of transparent structures, wherein the at least one support rod is arranged to be displaced in the vertical direction, at least one base rod fixedly coupled to a second transparent structure of the pair of transparent structures, a plurality of blinds arrayed in the vertical direction and arranged spaced apart from each other with a first end of each of the plurality of blinds being pivotally coupled to the at least one base rod and a second end of each of the plurality of blinds being attached to the at least one support rod to enable the pivoting of the plurality of blinds between a horizontal position and a slanted position, and an actuator operatively coupled to the at least one support rod and configured to displace the at least one support rod in the vertical direction to pivot the plurality of blinds to control an angle of the light beam exiting the external shutter assembly.

18. The external shutter assembly of claim 17 further including at least one first sensor to determine a distance of an approaching vehicle from the vehicle, and a controller configured to control the actuator to pivot the plurality of blinds based on the input received from the at least one first sensor.

19. The external shutter assembly of claim 17 further including at least one second sensor to determine an intensity of light coming from an approaching vehicle, and a controller configured to control the actuator to pivot the plurality of blinds based on the input received from the at least one second sensor.

20. The external shutter assembly of claim 17, wherein each of the blinds includes a reflective surface to reflect the light beam received from the headlight at a desired angle.

* * * * *